United States Patent
Hriadel et al.

(10) Patent No.: US 11,719,174 B2
(45) Date of Patent: Aug. 8, 2023

(54) SYSTEM FOR TURBOCHARGER PERFORMANCE MONITORING AND ADAPTATION

(71) Applicant: Garrett Transportation I Inc., Torrance, CA (US)

(72) Inventors: David Hriadel, Prague (CZ); Martin Procházka, Prague (CZ); Matej Pčolka, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/860,545

(22) Filed: Jul. 8, 2022

(65) Prior Publication Data

US 2022/0341367 A1 Oct. 27, 2022

Related U.S. Application Data

(63) Continuation of application No. 17/008,157, filed on Aug. 31, 2020, now Pat. No. 11,408,359.

(51) Int. Cl.
*F02D 41/00* (2006.01)
*F02B 37/18* (2006.01)
*F02B 37/04* (2006.01)

(52) U.S. Cl.
CPC ........ *F02D 41/0007* (2013.01); *F02B 37/183* (2013.01); *F02B 37/04* (2013.01)

(58) Field of Classification Search
CPC ......... F02D 41/0007; F02D 2200/0402; F02D 2200/0414; F02D 2200/0416; F02D 41/22;

(Continued)

(56) References Cited

U.S. PATENT DOCUMENTS 4,046,003 A 9/1977 Armstrong et al.
5,968,107 A 10/1999 Vogan et al.
(Continued)

FOREIGN PATENT DOCUMENTS

EP 2489851 A1 8/2012

OTHER PUBLICATIONS

Joshi, Alok et al., Assessment of Charge-Air Cooler Health in Diesel Engines Using Nonlinear Time Series Analysis of Intake Manifold Temperature, Jul. 2009, Journal of Dynamic Systems Measurement and Control, 1-10 (Year: 2009).*

(Continued)

*Primary Examiner* — Mickey H France
*Assistant Examiner* — Edward Bushard
(74) *Attorney, Agent, or Firm* — Seager, Tufte & Wickhem, LLP

(57) ABSTRACT

New and/or alternative approaches to physical plant performance control that can account for the health of the physical plant. A physical plant may be controlled by configurable controller, which may further comprise a low level controller associated with a higher level controller such as an Engine Control Unit (ECU). The ECU uses modeling to calculate an estimated operating value of a first parameter in the physical plant, and also uses a sensor to measure an operating value of the first parameter. The measured and modeled values are compared to determine the state of health (SOH) of the physical plant or a component thereof. The SOH may be stored, transmitted, or used to modify one or more control values used by the low level controller.

20 Claims, 7 Drawing Sheets

(58) Field of Classification Search
CPC .... F02D 41/266; F02D 41/1401; F02D 23/00; F02D 2041/1409; F02D 2041/1416; F02B 37/183; F02B 37/04; F02B 2037/122; F02B 2037/125; F02B 29/0493; F02M 35/10157; F02M 35/1038
See application file for complete search history.

(56) References Cited

U.S. PATENT DOCUMENTS

| | | | |
|---|---|---|---|
| 6,298,718 | B1 | 10/2001 | Wang |
| 6,637,205 | B1 | 10/2003 | Ahmad et al. |
| 7,143,580 | B2 | 12/2006 | Ge |
| 7,296,562 | B2 | 11/2007 | Withrow et al. |
| 7,631,498 | B2 | 12/2009 | Greentree |
| 8,146,358 | B2 | 4/2012 | Greentree |
| 8,850,878 | B2 | 10/2014 | Flynn et al. |
| 9,014,918 | B2 | 4/2015 | Hagen et al. |
| 9,789,756 | B2 | 10/2017 | Schwartz et al. |
| 10,026,241 | B1 * | 7/2018 | Sankavaram ............ F02D 41/18 |
| 10,152,834 | B1 * | 12/2018 | Sankavaram ....... F02D 41/2464 |
| 2004/0178895 | A1 * | 9/2004 | Pontius .................. F02D 41/22 340/439 |
| 2007/0079613 | A1 | 4/2007 | Greentree |
| 2009/0000298 | A1 | 1/2009 | Barthelet |
| 2009/0013687 | A1 | 1/2009 | Swenson et al. |
| 2009/0266073 | A1 | 10/2009 | Greentree |
| 2010/0292937 | A1 | 11/2010 | Hosny et al. |
| 2012/0245789 | A1 | 9/2012 | Ghoneim |
| 2013/0067915 | A1 | 3/2013 | Flynn et al. |
| 2014/0107885 | A1 | 4/2014 | Hagen et al. |
| 2015/0083096 | A1 | 3/2015 | Zagone et al. |
| 2016/0076438 | A1 | 3/2016 | Tabata et al. |
| 2016/0117427 | A1 * | 4/2016 | Lindgärde ............... G06F 30/20 703/8 |
| 2016/0265468 | A1 | 9/2016 | Takayanagi et al. |
| 2017/0044971 | A1 | 2/2017 | Racca |
| 2017/0096952 | A1 | 4/2017 | Yu et al. |
| 2017/0152799 | A1 | 6/2017 | Lee et al. |
| 2018/0051638 | A1 | 2/2018 | Wang et al. |
| 2018/0106202 | A1 | 4/2018 | Dickson et al. |
| 2019/0226389 | A1 | 7/2019 | Byrd et al. |
| 2019/0385385 | A1 | 12/2019 | Davidson |
| 2019/0385386 | A1 | 12/2019 | Davidson |
| 2019/0385387 | A1 | 12/2019 | Davidson |
| 2020/0156675 | A1 | 5/2020 | Mangus et al. |

OTHER PUBLICATIONS

Hriadel, "Health Status Monitoring of Turbocharger for Passenger Vehicle Applications," Czech Technical University in Prague, 92 pages, Jan. 2019.

European Extended Search Report for EP Application No. 21185442.7, dated Jan. 12, 2022, 9 pages.

* cited by examiner

SYSTEM FOR TURBOCHARGER PERFORMANCE MONITORING AND ADAPTATION

CROSS REFERENCE TO RELATED APPLICATIONS

The present application is a continuation of U.S. patent application Ser. No. 17/008,157, filed Aug. 31, 2020, now U.S. Pat. No. 11,408,359, titled SYSTEM FOR TURBOCHARGER PERFORMANCE MONITORING AND ADAPTATION, the disclosure of which is incorporated herein by reference.

FIELD

Automotive controllers and configurations for such controllers.

BACKGROUND

A turbocharger is used to enhance engine performance by compressing intake air, which is fed into the engine, using power obtained typically from the exhaust airstream of the engine and/or from auxiliary sources such as an electric motor. The behavior of the air passing through the turbocharger compressor is described by thermodynamics and is typically characterized in test procedures to generate a multi-variate mapping (the "compressor map"). The compressor map links together parameters such as compressor wheel rotational speed, compressor air mass flow, compressor pressure ratio, and compressor isentropic efficiency. Included in the compressor map are boundaries that define limits of the operation of the compressor. For example, the surge line on a compressor map defines conditions that can lead to air flowing in reverse through the turbocharge compressor, causing loss of power and potentially damaging the compressor.

The compressor map is used to control various actuators to obtain desirable performance. For example, proportional-integral-derivative (PID) control may be used to maintain a boost pressure setpoint, or model predictive control (MPC) may be used to optimize one or more actuators in light of the compressor map and various sensed inputs (such as engine conditions, ambient conditions and throttle position).

Decreases in turbocharger performance occur over time as various components degrade. From the user's perspective, all that may be apparent is a reduction in performance, loss of power, or increase in fuel consumption. Troubleshooting in response to user complaints is non-trivial. New and alternative methods and systems capable of identifying and/or characterizing the state of turbocharger and/or compressor health are desired to provide one or more of adaptive control, predictive maintenance, and easier troubleshooting.

OVERVIEW

The present inventors have identified a need to estimate compressor health with respect to overall as well as component performance. As changes in compressor health occur, the nominal compressor map may no longer characterize performance, leading to suboptimal control and reduced performance. Sensed and estimated parameters of ongoing performance of an engine and turbocharger are captured and used to estimate or predict further parameters, which can then be compared to actual measurements to generate a health indicator value. The health indicator value relates to, such as by being proportional to, the deviation of turbocharger and/or compressor performance from nominal.

In some examples, the health indicator value may be stored and used during maintenance to aid in differentiating between compressor faults and fault due to other engine systems or components. In other examples, the health indicator value may be used to estimate shifting of the compressor map, which may in turn be used to update the engine control unit (ECU) settings used to control engine and turbocharger operation. The updated ECU settings may be implemented to, for example and without limitation, adjust boundary conditions used to prevent surge, and/or to estimate compressor outlet temperatures to prevent damage to the charge air cooler.

A first illustrative and non-limiting example takes the form of a configurable controller for controlling a physical plant having associated therewith a plurality of actuators for controlling operation of the physical plant and a plurality of sensors for observing a plurality of characteristics of the physical plant operations, the configurable controller comprising: a state observer configured to capture the current state of the physical plant by communication with the plurality of sensors; and a low level controller configured to control behavior of the physical plant using at least the actuators; and an engine control unit (ECU) coupled to the low level controller, the ECU configured for analyzing the state of health (SOH) of the physical plant by: using one or more models for the physical plant, estimate an operating value of a first parameter in the physical plant; using a sensor, measuring an operating value of the first parameter in the physical plant; comparing the estimated value to the measured value for the first parameter to calculate a difference in the first parameter; and calculating SOH of the physical plant using the difference in the first parameter.

Additionally or alternatively, the physical plant is an internal combustion engine having associated therewith a turbocharger and a charge air cooler (CAC), the CAC having an outlet at which one of the plurality of sensors is positioned for sensing temperature of the CAC outlet, and the first parameter is the CAC outlet temperature. Additionally or alternatively, the ECU is configured to store the SOH for later retrieval during maintenance operations on the physical plant. Additionally or alternatively, the ECU is configured to transmit the SOH to a remote memory location for use in maintenance operations for the physical plant. Additionally or alternatively, the low level controller is configured to use one or more boundary conditions to control behavior of the physical plant, and the ECU is adapted to use the SOH to modify one or more of the boundary conditions used by the low level controller. Additionally or alternatively, the low level controller is configured to use one or more target conditions to control behavior of the physical plant, and the ECU is adapted to use the SOH to modify one or more of the target conditions used by the low level controller.

Additionally or alternatively, the low level controller uses proportional-integral-derivative (PID) control, and the one or more target conditions are one or more setpoints used in the PID control. Additionally or alternatively, the low level controller uses a model predictive control (MPC), and the one or more target conditions are target values for a cost calculation used in the MPC. Additionally or alternatively, the configurable controller is further configured to: store a plurality of SOH values over time, calculate an SOH trend, and predict a time to performance failure of one or more components of the physical plant.

Additionally or alternatively, the configurable controller is further configured to: determine, using the SOH whether a component of the physical plant reached a threshold for performance failure; identify, or receive an indication of a reduction in performance of the physical plant; and either: if the component has reached the threshold for performance failure, report to a user that the component is a candidate root cause for the reduction in performance; or if the component has not reached the threshold for performance failure, report to a user that the component is not a candidate root cause for the reduction in performance. Additionally or alternatively, the physical plant is an internal combustion engine having associated therewith a turbocharger having a compressor, and the low level controller uses a compressor map for the turbocharger, further wherein the ECU is adapted to modify the compressor map using the SOH. Additionally or alternatively, the compressor map includes a surge line, and the ECU is adapted to adjust the surge line in view of the SOH.

A second illustrative and non-limiting example takes the form of a method of operating a physical plant and an associated configurable controller, the physical plant having a plurality of actuators for controlling operation of the physical plant and a plurality of sensors for observing a plurality of characteristics of the physical plant operations, with the plurality of actuators and plurality of sensors operably linked to the configurable controller, the method comprising: capturing the current state of the physical plant by communication with the plurality of sensors; controlling behavior of the physical plant using at least the actuators; using one or more models for the physical plant, estimating an operating value of a first parameter in the physical plant; using a sensor, measuring an operating value of the first parameter in the physical plant; comparing the estimated value to the measured value for the first parameter to calculate a difference in the first parameter; calculating a state of health (SOH) of the physical plant using the difference in the first parameter; and storing the SOH using the configurable controller.

Additionally or alternatively, a method may comprise using the method of the second illustrative and non-limiting example to store a plurality of SOH values over time; calculating an SOH trend; and predicting a time to performance failure of one or more components of the physical plant.

Additionally or alternatively, a method may comprise using the method of the second illustrative and non-limiting example to store one or more SOH values; determining, using the SOH whether a component of the physical plant reached a threshold for performance failure; identifying a reduction in performance of the physical plant; and either: if the component has reached the threshold for performance failure, reporting to a user that the component is a candidate root cause for the reduction in performance; or if the component has not reached the threshold for performance failure, reporting to a user that the component is not a candidate root cause for the reduction in performance.

Additionally or alternatively, the physical plant is an internal combustion engine having associated therewith a turbocharger and a charge air cooler (CAC), the CAC having an outlet at which one of the plurality of sensors is positioned for sensing temperature of the CAC outlet, and the first parameter is the CAC outlet temperature. Additionally or alternatively, the configurable controller stores the SOH in an on-board memory for later retrieval during maintenance operations on the physical plant. Additionally or alternatively, the step of storing the SOH includes the configurable controller transmitting the SOH for storage to a remote memory location for use in maintenance operations for the physical plant. Additionally or alternatively, the step of controlling behavior of the physical plant using at least the actuators comprises using one or more boundary conditions to control behavior of the physical plant, and the method further comprises the configurable controller using the SOH to modify one or more of the boundary conditions.

Additionally or alternatively, the step of controlling behavior of the physical plant using at least the actuators comprises using one or more target conditions to control behavior of the physical plant, and the method further comprises the configurable controller using the SOH to modify one or more of the target conditions.

Additionally or alternatively, the configurable controller uses proportional-integral-derivative (PID) control, and the one or more target conditions are one or more setpoints used in the PID control. Additionally or alternatively, the configurable controller uses a model predictive control (MPC), and the one or more target conditions are target values for a cost calculation used in the MPC. Additionally or alternatively, the physical plant is an internal combustion engine having associated therewith a turbocharger having a compressor, and the low level controller uses a compressor map for the turbocharger, further wherein the ECU is adapted to modify the compressor map using the SOH. Additionally or alternatively, the compressor map includes a surge line, and the ECU is adapted to adjust the surge line in view of the SOH.

A third illustrative and non-limiting example takes the form of a vehicle comprising: an internal combustion engine having associated therewith a plurality of actuators for controlling operation of the physical plant and a plurality of sensors for observing a plurality of characteristics of the physical plant operations, the internal combustion engine comprising a charge air cooler (CAC) and a turbocharger having a compressor for compressing engine intake air using power derived from a turbine receiving exhaust air from the engine, the CAC positioned having an inlet to receive charged air from the compressor and an outlet to issue cooled charged air to the engine intake, the engine including a CAC outlet temperature sensor; a configurable controller for controlling the physical plant, operably coupled to the actuators and the sensors, the configurable controller including a state observer configured to capture the current state of the physical plant by communication with the plurality of sensors, a low level controller configured to control behavior of the physical plant using at least the actuators, an engine control unit (ECU) coupled to the low level controller, the ECU configured for analyzing the state of health (SOH) of the engine by: using one or more models for the engine, determining an estimated CAC outlet temperature; using the CAC outlet temperature sensor, determining an measured CAC outlet temperature; comparing the estimated CAC outlet temperature value to the measured CAC outlet temperature a parameter difference; and calculating SOH of the engine using the parameter difference.

This overview is intended to provide an introduction to the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
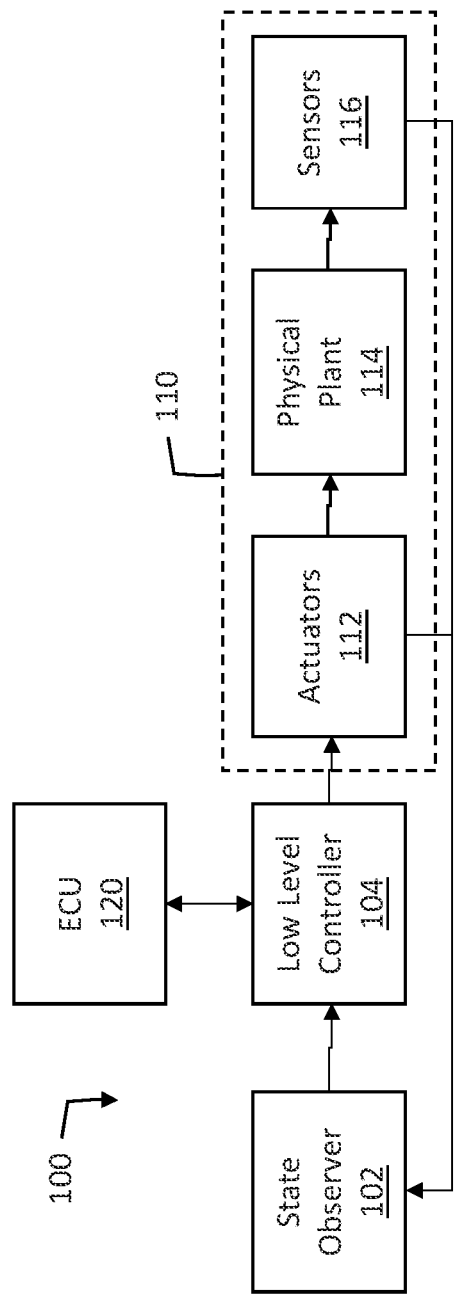
FIG. 1 shows a model of an operational control system.

FIG. 1 shows a model of an operational control system. A control apparatus is shown at 100 and includes a state observer 102, which feeds a set of current state variables to a low level controller 104. The low level controller calculates a solution for process parameters that can be applied to a set of actuators 112, which in turn control operation of the physical plant 114. The set of actuators may control, for example and without limitation, fuel or other injectors, variable nozzle turbine position, engine brake, after-treatment (including exhaust), throttle position, exhaust gas recirculation (EGR), an electric motor (in an electric turbocharger for example, which may be controlled via pulse width modulation (PWM)), the waste gate (WG) position (stroke), charge air cooler (CAC) functions, position of the recirculation valve, position of a variable compressor geometry actuator; and other valves, nozzles, parts and positions in the system.

The physical plant 114 may be, for example and without limitation, an internal combustion engine, whether diesel or gasoline. A plurality of sensors 116 are provided. Sensors 116 may include, for example, and without limitation, sensors detecting manifold absolute pressure (MAP), mass air flow (MAF), EGR flow, turbo speed, NOx, engine speed, fuel quantity, boost pressure, etc. Additional monitored parameters may include, for example, torque output of the electric motor of an electric turbocharger, waste gate (WG) normalized opening, recirculation valve (RCV) normalized opening, and/or a variable geometry compressor position and configuration. Sensors 116 may in some examples sense user inputs, such as pressure on brake or acceleration pedals and/or steering wheel position (and changes to such). Sensors 116 may be configured to sample the underlying parameter being sensed and provide the result of such samples to the state observer 102. The state observer 102 may record the sensor outputs and actuator positions over time to provide history of the system operation.

In some examples, the system includes an eTurbo apparatus. Some examples of design for and use of an eTurbo are shown in US PG Pat. Pub. No. 2009/0000298 and U.S. Pat. No. 6,637,205. ETurbo uses an electric motor to drive the compressor of the turbocharger in certain conditions. For example, when exhaust pressure is low due to low engine speed, the electric motor can be used to increase compressor speed above what can be provided relying only on the exhaust pressure of the engine. The electric motor may be battery powered by a battery that can be charged to store the recovered energy that would otherwise be lost when slowing down the eTurbo, for example, or it may be powered using energy drawn from the engine itself via an alternator. The sensors 116 may be used to sense motor and/or battery characteristics (state of charge, temperature, etc.), and the actuators 112 may control operations of the electric motor and may include, for example and without limitation, electrical signal controllers (such as switches and other electronic componentry).

The state observer 102 and low level controller 104 may be, for example, implemented in a microcontroller configured to operate on a set of stored instructions for performing a state observation and optimization routine. In another example, an application specific integrated circuit (ASIC) may provide state observer functions, which can include the capture or accumulation of data from the actuators 112 and/or sensors 116, which in turn may be read periodically by a microcontroller. The low level controller 104 may be configured with circuitry, logic, and/or stored instruction sets for performing a control and/or optimization calculation using, for example, model predictive control (MPC) cost functions, linear quadratic regulator (LQR) control, proportional integral derivative (PID) control, or other control methods.

The low level controller 104 may be integrated into, or provided separately from, an on-board diagnostics system (not shown) that can be used to record diagnostic variables and present them, as needed to the user or to store for later analysis. The low level controller 104 is shown operatively linked to the overall engine control unit (ECU) 120. In some examples, the ECU 120 may be enabled to manipulate one or more control values used in the low level controller, such as by modifying one or more setpoints (for example in PID control), or one or more factors used in an MPC cost function, such as coefficients or weighting values used therein. Separate blocks 102, 104 and 120 are shown, however, it should be understood that this architecture may be integrated into a single processor or microcontroller, if desired. In other examples, separate ASIC, state machine(s), microcontroller(s) or microprocessors may be provided for each block 102, 104 and 120, as desired.

The control solution calculated by the low level controller 104 is used to generate one or more outputs, which in turn are used to control the actuators 112 to operate the physical plant 114. Generally speaking the aim is to minimize the distance of operating parameters from one or more target output values for the controllable outputs or physical plant operating characteristics. For example, the targets may be any of target turbocharger speed, target boost pressure, target pressure difference over the compressor, target air mass flow or a combination thereof. With MPC functions, the distance to target or reference values for the one or more output values (or resulting operating characteristics) is minimized, thus optimizing performance. As an example, a traditional MPC cost function formation may be as shown in Equation 1:

$$J_{MPC} = \min \Sigma_{k=1}^{P} \|y_{r,k} - y_k\| W_1 + \|u_{d,k} - u_k\| W_2, \quad [\text{Eq.1}]$$

Where $u_{d,k}$ corresponds to the desired profile for the manipulated variable, $u_k$ stands for the manipulated variable, k denotes discrete time instance, and P stands for the prediction horizon of the predictive controller. In this example, $y_{r,k}$ and $y_k$ represent the output reference and measured value, respectively, and $W_1$ and $W_2$ specify the weighting terms. The MPC cost function is minimized in operation in order to provide optimal control to the physical plant, and the low level controller 104 may use MPC accordingly.

In another example, a PID controller can be used to account for each of proportional, integral, and derivative differences from a target operating point. A target operating point for PID control may use a single value, such as compressor boost pressure, or may use a plurality of values such as compressor speed and compressor boost pressure, while controlling other factors (actuator positions, for example) to direct operations to maintain such target(s). The proportional difference may indicate current state, integral difference may identify a process shift over time, and derivative difference may indicate the direction of changes in operation. With PID control, a proportional difference is minimized while monitoring to ensure that the integral and derivative differences do not indicate changing performance which may, after further iterations, cause the proportional difference to increase. The control parameters output to the actuators 112 are, for a PID controller, adjusted to reduce or minimize the distance of actual performance from one or more targets on an iterative basis. PID control may incorporate multiple different target operating characteristics. The low level controller 104 may use PID control instead of MPC, for example. LQR control may be used instead, if desired, applying similar concepts.

The ECU 120 (or in an alternative a separate controller or ASIC) may be used to calculate and store certain values calculated to reflect the state of health (SOH) of one or more of the actuators 112, physical plant 114 and/or sensors 116, either in an on-board memory or by transmission to remote data storage. In some examples, the ECU 120 can manipulate one or more parameters used in the low level controller 104, or may manipulate values stored by and relied upon in the ECU 120 to provide information to the low level controller 104.

Figure 2:
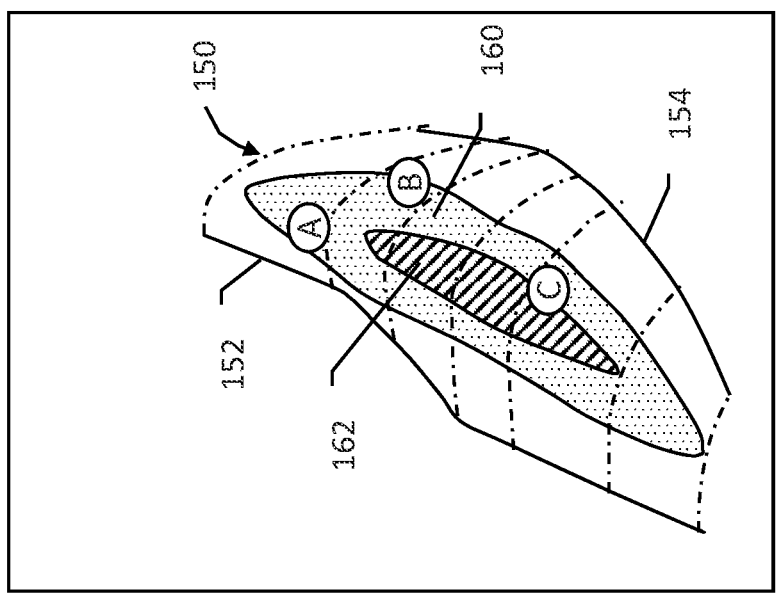
FIG. 2 shows an illustrative compressor map.

FIG. 2 shows an illustrative and simplified compressor map. The compressor map uses corrected air mass flow as the X-axis, and the pressure ratio of the compressor as the Y-axis. Several turbocharger speed lines 150 cross the graph and are associated with different compressor speeds. Boundary conditions are included, with a surge line 152 on the left side of the drawing, and a choke line 154 on the right side of the drawing. The surge line 152 indicates the maximum pressure the turbocharger can generate at a given mass flow. The choke line 154 indicates the maximum amount of mass flow at a given pressure ratio. Operation outside of these boundaries 152, 154 is avoided to prevent degraded (and unpredictable) operation as well as potential damage to components.

The efficiency of a turbocharger reflects the ability to compress the air without adding excessive heat. The higher the efficiency, the cooler the outlet temperature for a given boost pressure (though still exceeding ambient temperature). Efficiency islands are shown in the graphic at 160 and 162, with each "island" defining combinations of factors resulting in improved efficiency. For example, operating inside the boundary 160 may correlate to efficiency at or above 65%, and inside island 162 may correlate to an efficiency of 75% or higher.

For a given turbocharger installation, testing can be performed at a test stand to establish the compressor map, and the ECU is then loaded with data representative of the compressor map. Factors for use in control, such as MPC, PID and/or LQR are then derived using the compressor map and other system characteristics, as well as, at least in some examples, user preferences. The compressor map in FIG. 2 is simplified; an actual compressor map would include more lines to provide greater granularity. In use, the system is subject to several competing goals, including maximizing efficiency at a given turbo speed and air mass flow, for example, and the compressor map as shown would be converted to data and stored by the ECU.

Figure 3:
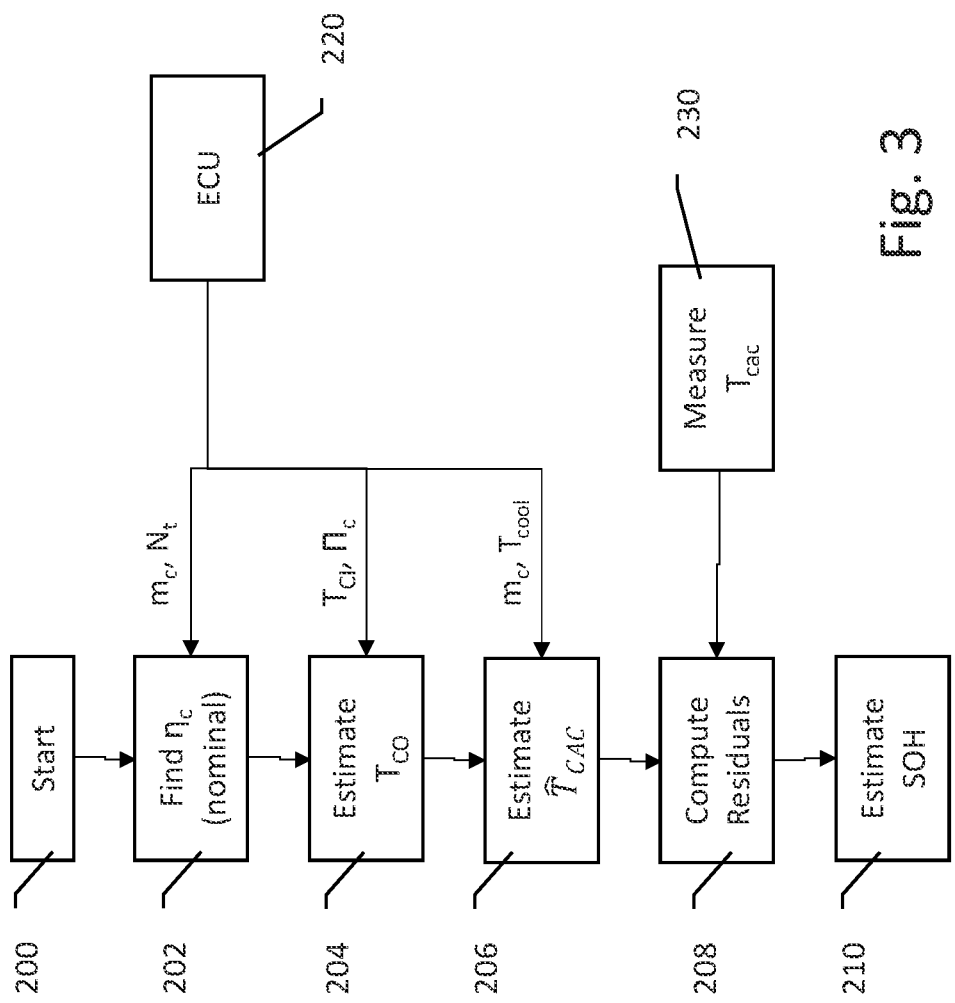
FIG. 3 is a block method flow diagram for an illustrative example for calculating a health indicator.

FIG. 3 is a block method flow diagram for an illustrative example for calculating a health indicator. A start block is shown at 200. In some examples the start block first ensures that appropriate qualifying conditions are present, as by requiring a minimum turbocharger speed, ambient or internal temperature, engine load within minimum and/or maximum load boundaries, and operation or steady-state operation for at least a minimum period of time, for example. Other qualifying conditions may apply in start block 200.

Next, the compressor map is used to obtain a nominal compressor efficiency, $\eta_c$, using the corrected compressor mass flow as well as the corrected turbocharger speed, as indicated at 202. The "compressor map" used at 202 may be the nominal compressor map, or it may be a compressor map that has previously been adjusted by the method of FIG. 4, as explained below. The corrected compressor mass flow takes into account system temperatures and pressures to adjust a known (measured) compressor mass flow. The corrected turbocharger speed may be the measured turbospeed, adjusted for the difference in actual compressor inlet temperature conditions to the compressor map reference compressor inlet temperature conditions.

Next, as shown at 204, an estimated compressor outlet temperature $T_{CO}$ is calculated using each of $\eta_c$, and the estimated or measured temperature at the compressor inlet, $T_{CI}$, and the compressor pressure ratio $\Pi_c$.

In block 206, an estimate of the CAC temperature $\hat{T}_{CAC}$ is obtained using a polynomial or other mathematical formula or model. For example, the formula or model may accept the compressor mass flow, CAC coolant temperature, and the estimated compressor outlet temperature $T_{CO}$. In parallel with this activity, the actual CAC temperature $T_{cac}$ is measured at block 230. For example, an extended Kalman filter may be applied to find an optimal estimate of the CAC temperature $\hat{T}_{CAC}$ and to reject sensor noise and model inaccuracies. Such a filter may use a dynamic model of compressor outlet temperature based on the gas compression formula, which itself may be adjusted in relation to the fluid dynamics of the air passing through the system.

At block 208, the estimated CAC temperature $\hat{T}_{CAC}$ is compared to the measured CAC temperature $T_{cac}$. The difference(s) identified is used to calculate a set of residuals indicative of the CAC SOH. In particular, variation of the estimated CAC temperature, $\hat{T}_{CAC}$, from the measured value, $T_{cac}$, is used to determine whether the underlying model, including the compressor map, matches operation of the system. For example, the variation between estimated and measured CAC temperature may indicate a compressor efficiency $\eta_c$ that is different from what the compressor map indicates. In a non-limiting example, an observer may be used to monitor the system, and the residuals may be computed as differences between predicted CAC outlet temperature and the measured value.

In general, as used herein, the residual represents the difference between a measured value and an estimated value for a given parameter/variable. In a nominal case, with no faults, the residuals will be very small. If the system is subject to a failure mode, then residuals grow. Residuals can be compared to a numerical failure threshold to identify actual failure, and/or may be tracked in a trending process to estimate when the failure threshold is likely to be exceeded. Rather than direct comparison and trending, residuals can be transformed to an auxiliary variable or set of auxiliary variables, which represent the normalized state of health of the system. The auxiliary variable(s) can then be used for failure threshold and trend analysis.

Additional data may be incorporated in block 208, such as by calculating a turbocharger speed residual, or other values, which may vary in view of the available sensors and configuration of the system. It may be desirable to incorporate redundant information where possible to estimate state of health of any system components. In an example, availability of a turbo-speed measurement may be used together with the compressor map function to determine compressor map shift by calculating residuals of turbo-speed estimate and/or turbo-speed measurement. However, the methods and systems described herein are not limited to the use of the turbo-speed sensor, and other measurable factors which, in parallel to measurement, can be estimated by the use of models reliant on other system variables, can be used instead.

Finally, the compressor state of health (SOH) is estimated by transforming the residuals from block 208, either directly or as weighted or in weighted combination. The SOH in some examples is then scaled to an interval <0, 1>, though any other scaling interval may be used (such as scaling to an 8 bit or 4 bit range for purposes of data storage).

Figure 4:
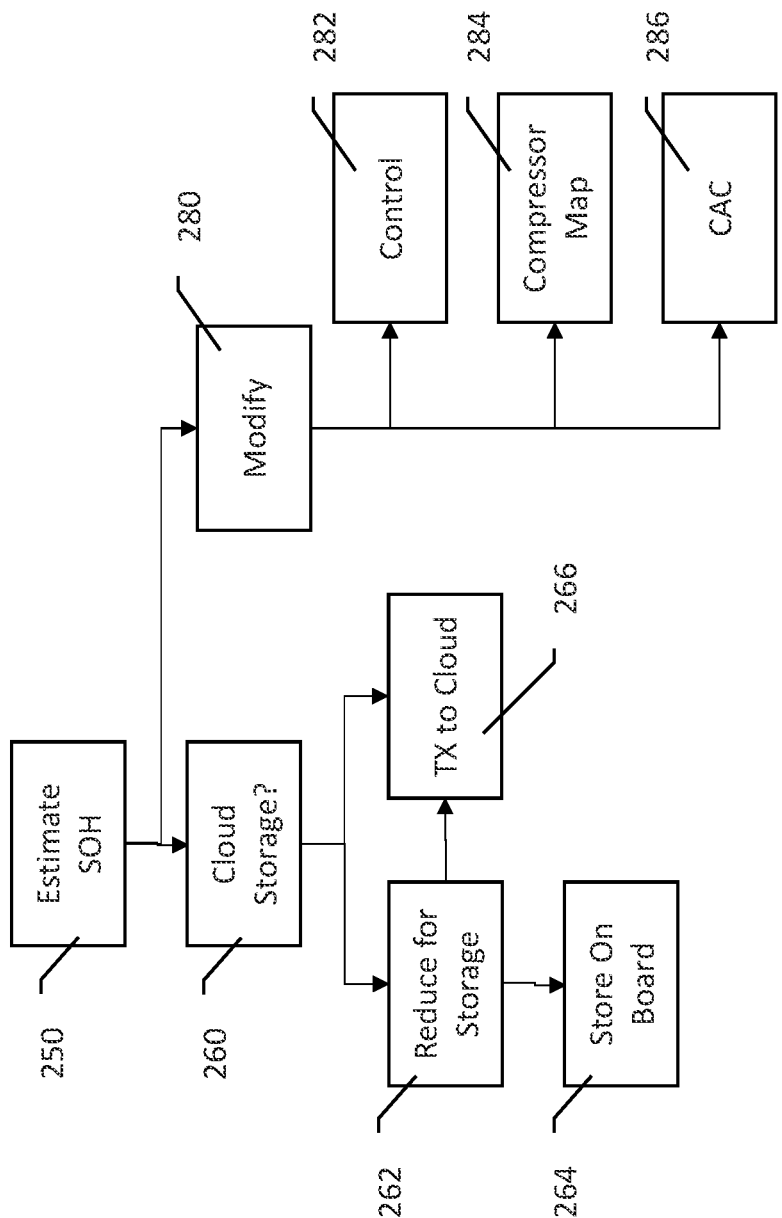
FIG. 4 is a block method flow diagram for an illustrative example for using a health indicator.

FIG. 4 is a block method flow diagram for an illustrative example for using a health indicator. The health indicator may be the SOH as calculated in FIG. 3, and/or may incorporate the residuals rather than just the final value. At block 250, the SOH is calculated. The method determines whether cloud storage is available at block 260 and, if so, the SOH can be transmitted as indicated at 266 to a cloud server or other storage location using, for example and without limitation, cellular or other wireless communication. Data may be periodically transmitted in block 266 such as by storing SOH data temporarily on-board until the system is in a location where transmission is available, such as, for example, if a user of a passenger vehicle links the vehicle to home WiFi or to a cellular phone. The data may be reduced, as indicated at 262, if desired, for transmission 266 or for storage in an onboard storage system 264. Data reduction 262 may include, for example and without limitation, calculating an average or median SOH in a single driving cycle/trip, potentially reducing storage requirement (which can be very limited in the on-board environment) and/or data transmission needs.

In some examples, the method in FIG. 4 goes a step further as indicated at 280 to modify one or more stored parameters, setpoints, or control weights or coefficients. For example, one or more setpoints, targets, weighting values, or other coefficients used in a control methodology may be modified, as indicated at 282. A setpoint used in PID control may be modified, for example, or a weighting value or coefficient used in MPC or other optimizing control method may be updated in block 282. In another example, one or more parts of a compressor map can be modified, as indicated at 284. As noted above, the difference in CAC temperature found in block 208 of FIG. 3 may indicate that the efficiency $\eta_c$ is different from that of the compressor map, and the compressor map can then be adjusted to account for this difference. However, various examples are not limited to simply modifying the compressor map at a single point to provide a different/new efficiency; portions of the compressor map that are distant from the actual operating position of the system may also be modified. For example, block 284 may call for one or more of adjusting a surge line or choke line, or by changing one or more efficiency islands, for example. The CAC settings, setpoints, and/or boundary conditions may be modified as indicated at 286, such as by changing a maximum temperature setting for CAC operation, or by increasing or decreasing circulation of the CAC coolant. Step 280 may be performed by the ECU, which can in turn apply changes identified at 282, 284, 286 to modify, for example, the low level controller operation (FIG. 1, block 104).

Modification at block 280 may include calculating parameter shift, such as shifting of compressor map parameters, using a polynomial transformation of the residuals and/or SOH value determined at 250. In some examples, the process of SOH estimation can be performed repeatedly when the underlying physical plant is operated at a variety of operating setpoints (different speeds, temperatures, loads, etc.), either in a directed process (in which different combinations of inputs are tested at the direction of the ECU in a diagnostic process), or by finding opportunities during normal operation (in which the user's decisions in operating the physical plant are observed and, when an opportunity to perform the method of FIG. 3 at distinct operating points arises, the method is run). In this example, by obtaining SOH estimations at different operating points, a model of the current state of health can be determined and used to compare to one or more stored alternative compressor maps, to find a best fit, for example.

For example, referring to FIG. 2, it may be desirable to obtain readings of SOH (using the method of FIG. 3, for example) at two or more locations in the compressor map, such as at points A, B, C shown in FIG. 2. By so doing, the system can then compare the performance (or $\eta_c$, for example) to stored compressor maps generated by operating a similar physical plant and/or turbocharger at various stages of health degradation, and/or having various types of health degradation (such as by determining the compressor map for installations having reduced WG operability, degraded compressor state, fouling, and/or typical aging without specific actuator or component issue). Furthermore, the selection of a best-fitting or most correlated compressor map from a plurality of alternative compressor maps each associated with a specific type of degradation may also allow the specific type of health degradation to be identified, aiding in any subsequent troubleshooting or other maintenance. For example, the health degradation information can be used within predictive maintenance frameworks to predict a trend of health degradation. For a vehicle operator, such an enhancement may be valuable to optimize the whole maintenance process in terms of vehicle availability and maintenance costs.

The use of such an approach is relatively easy to observe in the context of mass produced systems, such as OEM automobiles, trucks and airplanes, however, it may also be useful to the extent that operation of a turbocharger itself, independent of other configuration factors, may be capable of similar modeling approaches. In some examples, the process of calculating SOH and/or related residuals may be performed at multiple operating points and, further, may be performed by an on-board system, while the identification of best-fit or most-correlated compressor map (or other health degradation model) is performed off-line at a remote server or by a maintenance system.

The calculation of SOH performed in reliance on CAC temperature (estimated compared to measured values) can also be used to rule out compressor performance as an issue driving reduced performance of the system. More particularly, by relying on the air flow models associated with the turbocharger operation, it can be seen that the analysis is independent of other factors, such as fuel injector performance, for example. Supposing, for example, that the SOH estimate is close to a healthy state, this implies that the CAC temperature prediction is aligned with observed values, further indicating that nominal compressor performance is being delivered. If an unknown failure is present in the system, and the SOH estimate is close to a healthy state, the compressor as a source of failure may be ruled out. On the other hand, if the SOH is degraded, such as being close to a fault state, an unknown failure may be assumed to originate from the compressor or an input to the compressor (such as related sensors and actuators) until the compressor and/or inputs to the compressor can be ruled out. Using the turbocharger example then, if degraded performance (loss of power, reduced fuel efficiency) is observed, the SOH can lead the diagnosis through troubleshooting toward, or away from, the compressor.

In some examples, a best fit analysis may be used to drive modifications at block 280. For example, a plurality of modified operation models may be calculated using the nominal performance of the system and making assumptions regarding various modes of health degradation. Using the residuals from block 208, a best fit to one of the modified models may be determined, and the identified best fit model can then be used to adjust one or more factors in the control method 282, or the compressor map 284, or in overheating protection for the CAC 286. In addition, the model showing best fit to actual performance can be used to determine why health-related degradation is occurring by identifying which of several possible failure modes is represented by the best fitting model.

In another example, a linking function may be used to link SOH and map parameters in a predetermined way. For example, the ECU (or a remote server) may be operated to track performance to an expected map shift based on the calculated SOH. Thus, rather than attempting a best fit analysis to a plurality of model maps, the linking function can update map parameters as a function of the calculated SOH.

In examples of both method and system implementations, the SOH analysis may be used in a physical plant and an associated configurable controller, the physical plant having associated therewith a plurality of actuators for controlling operation of the physical plant and a plurality of sensors for observing a plurality of characteristics of the physical plant operations, with the plurality of actuators and plurality of sensors operably linked to the configurable controller. In one example, the configurable controller may be adapted to store a plurality of SOH values over time, calculate an SOH trend, and predict a time to performance failure of one or more components of the physical plant. In another example, the configurable controller may be adapted to communicate a plurality of SOH values over time to a remote server or an external servicing or diagnostic system, which may then calculate an SOH trend and predict a time to performance failure of one or more components of the physical plant. Such components of the physical plant may include individual components or systems, including operating parts (valves, CAC, compressor, etc.), actuators, and/or sensors.

In still further method and system implementation examples, the SOH analysis may be used by an on-board or external system to determine, using the SOH whether a component of the physical plant reached a threshold for performance failure; identify, or receive an indication of a reduction in performance of the physical plant; and either: if the component has reached the threshold for performance failure, report to a user that the component is a candidate root cause for the reduction in performance; or if the component has not reached the threshold for performance failure, report to a user that the component is not a candidate root cause for the reduction in performance. Rather than determining if the threshold for performance failure has been reached, another example may use a relative threshold such as by determining if the SOH indicates that a given component of the system has been expended to a selected percentage, relative to a performance failure threshold. For example, SOH for a given component may be rated from 0% to 100% expended, with 0% being a nominal condition (fully healthy), and 100% being a failure condition (or, using alternative language, an end-of-life condition), and an alert threshold may be set within the 0-100% range, such as at 75% expended, whereupon a given component may be considered a candidate root cause in the event of reduction in performance. In a still further example, an end-of-life condition may be determined for a component, and the failure threshold may be set relative to the end-of-life condition such as, again using a 0-100% range, at 75% expended. Other numerical boundaries can be used.

Figure 5:
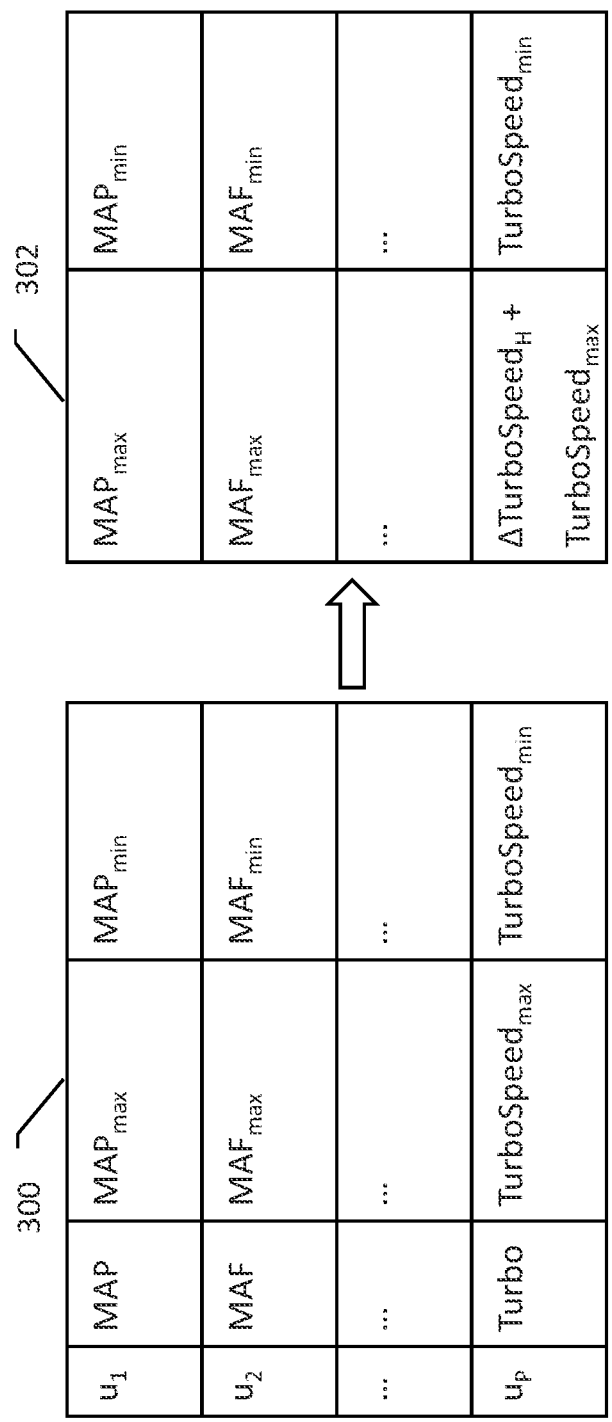
FIGS. 5-6 illustrate manipulation of control related values.
Figure 6:
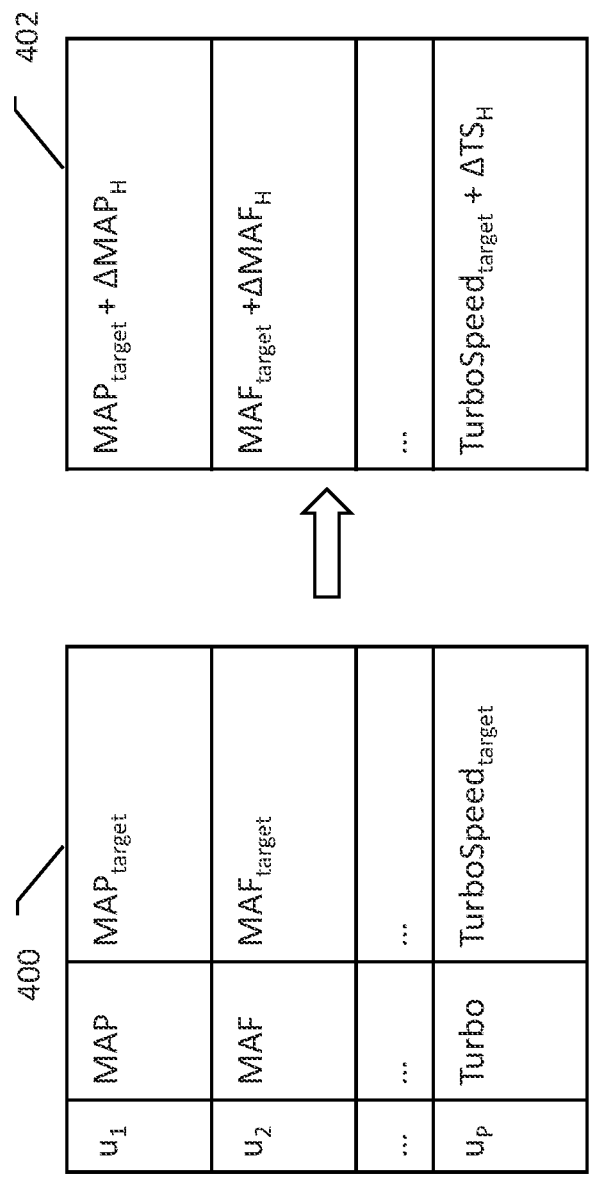
Figure 7:
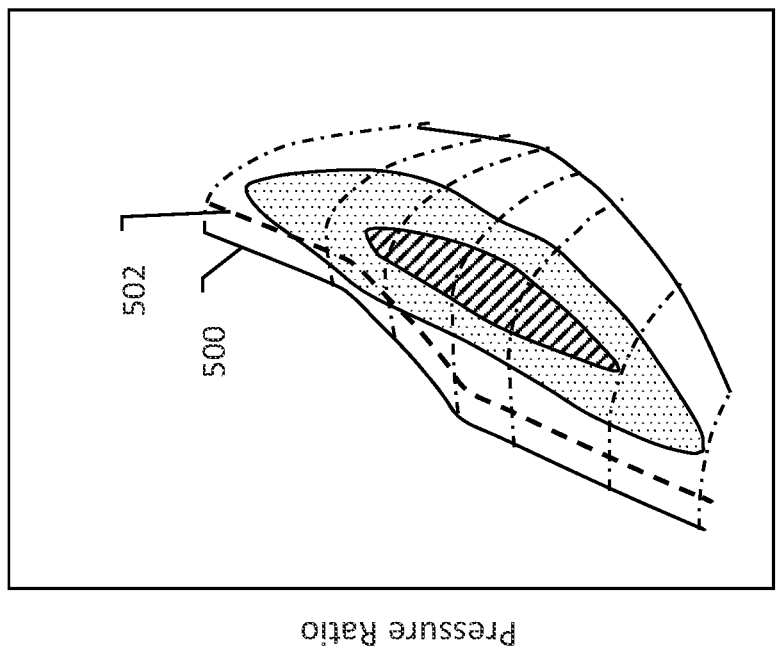
FIG. 7 shows modification of a compressor map.

FIGS. 5-7 illustrate manipulation of control related values. For example, as shown in FIG. 5, system memory may be used to store a table of monitored parameters having minimum and/or maximum values. A nominal table is shown at 300 with a plurality of such monitored parameters including, for example and without limitation, manifold absolute pressure (MAP), mass air flow (MAF), and turbo speed (TS, in the table). The parameters may have operating ranges that are allowed, and so the table in FIG. 5 shows maximum and minimum values for such operation. As shown at 302, however, one or more of the parameters may be modified, such as by changing the maximum TS (in this example) to account for the SOH of the system. For example, as health degrades, maximum TS may be reduced in relation (such as linear, quadratic, exponential, etc.) to SOH. For example, $\Delta TS_H$ (which would be negative in FIG. 5) may be determined using a polynomial based on the total SOH or one or more residual elements of SOH. One or more other parameters such as MAP or MAF may also be changed in a similar manner.

FIG. 6 shows another example, in which the nominal table 400 illustrates target values for the one or more parameters, rather than boundary conditions for operation. Here, again, one or more of the parameters can be modified as shown at 402. In making such modifications, the individual parameters (MAP, MAF, TS, or others) may each be modified in a different way, such as by using a different function (polynomial, exponential, etc.) for each, and/or by using different residual components of the SOH calculation, or the total SOH, in each analysis. In still other examples, one of the parameters may be modified by direct relation to SOH or a residual component thereof, while other parameters are then modified on the basis of the previously modified parameter. More specifically, in a non-limiting example, if the SOH calculation leads to a reduction in the maximum or target turbo speed, the MAF target may be adjusted accordingly.

While FIG. 5 shows an adjustment to operating boundary conditions, FIG. 6 shows an adjustment to the control targets, which may be used in optimization or PID type control methods.

FIG. 7 shows another example, specific to the turbocharger map. Here, the surge line, nominally at 500, has been moved to position 502, reducing the available area for operation of the system. This shift would again be determined by the use of the SOH value itself or one or more of the residuals associated with SOH calculation. A shift as shown may also be adopted by the use of a best fit modeling to one or more stored compressor maps, which can be identified and implemented as described above. Thus, rather than just shifting the surge line 500/502 as shown in FIG. 7, other features, including the curves, efficiency islands, and choke line, may be modified as well.

The above detailed description includes references to the accompanying drawings, which form a part of the detailed description. The drawings show, by way of illustration, specific embodiments. These embodiments are also referred to herein as "examples." In this document, the terms "a" or "an" are used, as is common in patent documents, to include one or more than one, independent of any other instances or usages of "at least one" or "one or more." Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Some examples can include elements in addition to those shown or described. The present inventors also contemplate examples using any combination or permutation of those elements shown or described herein.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of protection should be determined with reference to the appended claims, along with the full scope of equivalents to which such claims are entitled.

What is claimed is:

1. A configurable controller for controlling a physical plant having associated therewith a plurality of actuators for controlling operation of the physical plant and a plurality of sensors for observing a plurality of characteristics of the physical plant operations, the configurable controller comprising:

a state observer configured to capture a current state of the physical plant by communication with the plurality of sensors;

a low level controller configured to control behavior of the physical plant using at least one of the plurality of actuators; and an engine control unit (ECU) coupled to the low level controller, the ECU configured for analyzing the state of health (SOH) of the physical plant by:

a) using one or more models for the physical plant and the current state of the physical plant, estimating an operating value of a first parameter in the physical plant;

b) using one of the plurality of sensors, measuring an operating value of the first parameter in the physical plant; and c) comparing the estimated value to the measured value for the first parameter to calculate a difference in the first parameter as a system residual; and repeating steps a), b), and c) to obtain a series of system residuals during a period of use of the physical plant; and deriving a state of health from the series of system residuals;

wherein the low level controller is configured to use one or more boundary conditions to control behavior of the physical plant, and the ECU is adapted to use the SOH to modify one or more of the boundary conditions used by the low level controller.

2. The configurable controller of claim 1 wherein the physical plant is an internal combustion engine having associated therewith a turbocharger and a charge air cooler (CAC), the plurality of sensors including a CAC outlet temperature sensor, and the first parameter is the CAC outlet temperature.

3. The configurable controller of claim 1 wherein the ECU is configured to store the SOH for later retrieval during maintenance operations on the physical plant.

4. The configurable controller of claim 1 wherein the ECU is configured to transmit the SOH to a remote memory location for use in maintenance operations for the physical plant.

5. The configurable controller of claim 1 wherein the low level controller is configured to use one or more target conditions to control behavior of the physical plant, and the ECU is adapted to use the SOH to modify one or more of the target conditions used by the low level controller.

6. The configurable controller of claim 1, wherein the configurable controller is further configured to:
store a plurality of SOH values over time,
calculate an SOH trend, and
predict a time to performance failure of a component of the physical plant.

7. The configurable controller for claim 1, wherein the configurable controller is further configured to:
determine, using the SOH whether a component of the physical plant reached a threshold for performance failure;
identify, or receive an indication of a reduction in performance of the physical plant; and either:
if the component has reached the threshold for performance failure, report to a user that the component is a candidate root cause for the reduction in performance; or if the component has not reached the threshold for performance failure, report to a user that the component is not a candidate root cause for the reduction in performance.

8. The configurable controller of claim 1 wherein the physical plant is an internal combustion engine having associated therewith a turbocharger having a compressor, and the low level controller uses a compressor map having a surge line for the turbocharger, further wherein the ECU is adapted to modify the compressor map using the SOH, by adjusting the surge line.

9. A method of operating a physical plant and an associated configurable controller, the physical plant having a plurality of actuators for controlling operation of the physical plant and a plurality of sensors for observing a plurality of characteristics of the physical plant operations, with the plurality of actuators and plurality of sensors operably linked to the configurable controller, the method comprising:
   capturing a current state of the physical plant by communication with the plurality of sensors, wherein the physical plant is an internal combustion engine (ICE) having associated therewith a turbocharger and a charge air cooler (CAC), and the plurality of sensors includes a CAC outlet sensor positioned for sensing temperature of the CAC outlet;
   controlling behavior of the ICE using at least the actuators;
   analyzing a state of health (SOH) of the ICE by:
      a) using one or more models for the ICE, determining an estimated CAC outlet temperature;
      b) using the CAC outlet temperature sensor, determining a measured CAC outlet temperature;
      c) comparing the estimated CAC outlet temperature to the measured CAC outlet temperature to calculate a difference in the first parameter as a system residual;
   repeating steps a), b) and c) to obtain a series of system residuals during a period of use of the ICE; and
   deriving the SOH of the compressor from the series of residuals.

10. A method comprising:
    using the method of claim 9 to store a plurality of SOH values over time;
    calculating an SOH trend; and
    predicting a time to performance failure of a component of the physical plant.

11. A method comprising:
    using the method of claim 9 to store one or more SOH values;
    determining, using the SOH whether a component of the physical plant reached a threshold for performance failure;
    identifying a reduction in performance of the physical plant; and either:
    if the component has reached the threshold for performance failure, reporting to a user that the component is a candidate root cause for the reduction in performance; or
    if the component has not reached the threshold for performance failure, reporting to a user that the component is not a candidate root cause for the reduction in performance.

12. The method of claim 9 wherein the configurable controller stores the SOH in an on-board memory for later retrieval during maintenance operations on the physical plant.

13. The method of claim 9 wherein the step of storing the SOH includes the configurable controller transmitting the SOH for storage to a remote memory location for use in maintenance operations for the physical plant.

14. The method of claim 9 wherein the step of controlling behavior of the physical plant using at least the actuators comprises using one or more boundary conditions to control behavior of the physical plant, and the method further comprises the configurable controller using the SOH to modify one or more of the boundary conditions.

15. The method of claim 9 wherein the step of controlling behavior of the physical plant using at least the actuators comprises using one or more target conditions to control behavior of the physical plant, and the method further comprises the configurable controller using the SOH to modify one or more of the target conditions.

16. The method of claim 9, wherein the configurable controller uses a compressor map for the turbocharger to control engine operation, further wherein the configurable controller is adapted to modify the compressor map using the SOH.

17. A vehicle comprising:
    an internal combustion engine (ICE) having associated therewith a plurality of actuators for controlling operation of the ICE and a plurality of sensors for observing a plurality of characteristics of ICE operations, the ICE including a compressor for compressing engine intake air, a charge air cooler (CAC) having an inlet to receive compressed air from the compressor and an outlet, and a CAC outlet temperature sensor;
    a configurable controller for controlling the ICE, operably coupled to the actuators and the sensors, the configurable controller including a state observer configured to capture the current state of the ICE by communication with the plurality of sensors, a low level controller configured to control behavior of the ICE using at least the actuators, an engine control unit (ECU) coupled to the low level controller, the ECU configured for analyzing the state of health (SOH) of the compressor by:
       a) using one or more models for the ICE, determining an estimated CAC outlet temperature;
       b) using the CAC outlet temperature sensor, determining a measured CAC outlet temperature;
       c) comparing the estimated CAC outlet temperature to the measured CAC outlet temperature to calculate a difference and storing the difference as a system residual;
    repeating steps a), b) and c) to obtain a series of system residuals during a period of use of the physical plant; and
    deriving the SOH of the compressor from the series of residuals.

18. The vehicle of claim 17, wherein the configurable controller is further configured to store a plurality of SOH values over time for the compressor, and predict a time to performance failure of the compressor.

19. The vehicle of claim 17, wherein the configurable controller is further configured to:
    determine, using the SOH, whether a component of the ICE has reached a threshold for performance failure;
    identify a reduction in performance of the ICD; and either:
    if the component has reached the threshold for performance failure, reporting to a user that the component is a candidate root cause for the reduction in performance; or if the component has not reached the threshold for performance failure, reporting to a user that the component is not a candidate root cause for the reduction in performance.

20. The vehicle of claim 17, wherein the configurable controller is further configured to:
   control behavior of the ICE using one or more boundary conditions; and
   use the SOH to modify one or more of the boundary conditions.

* * * * *